O. S. HELLUMS.
COTTON CHOPPER.
APPLICATION FILED AUG. 1, 1912.
1,064,645.
Patented June 10, 1913.
3 SHEETS—SHEET 1.
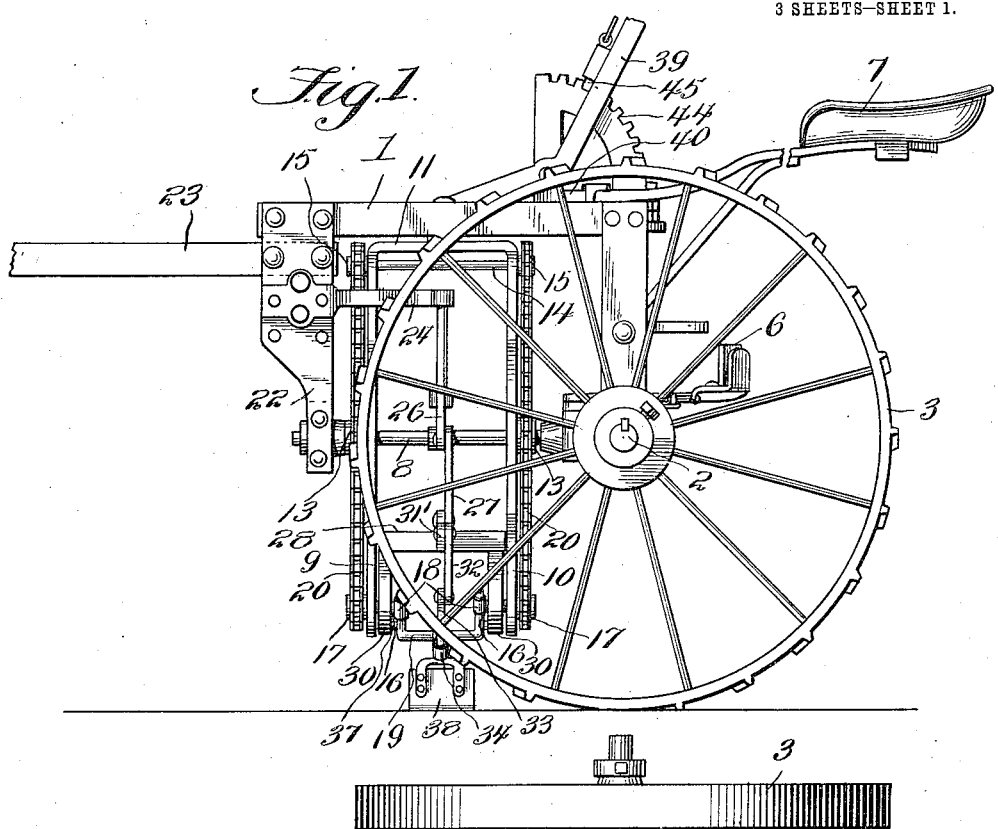
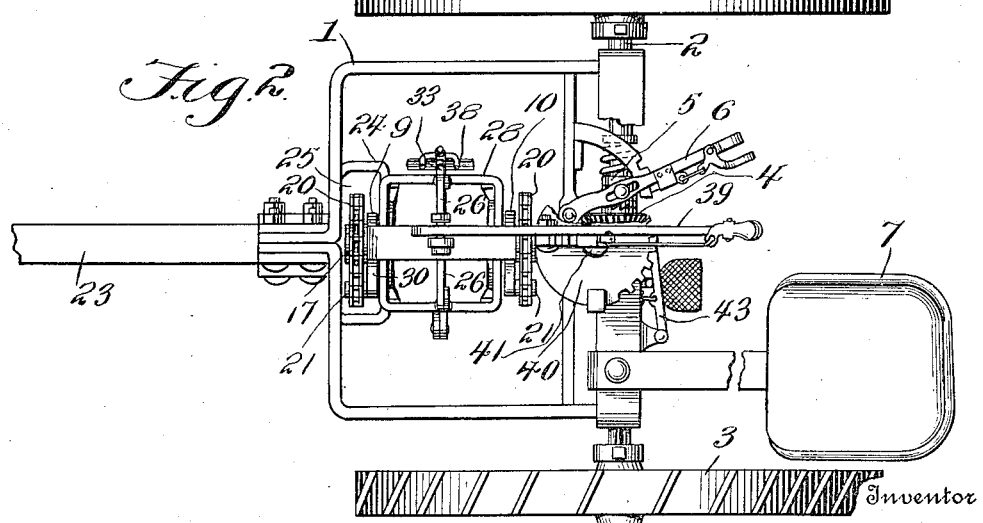
Witnesses
J. T. L. Wright
Inventor
Oscar S. Hellums,
By Victor J. Evans,
Attorney

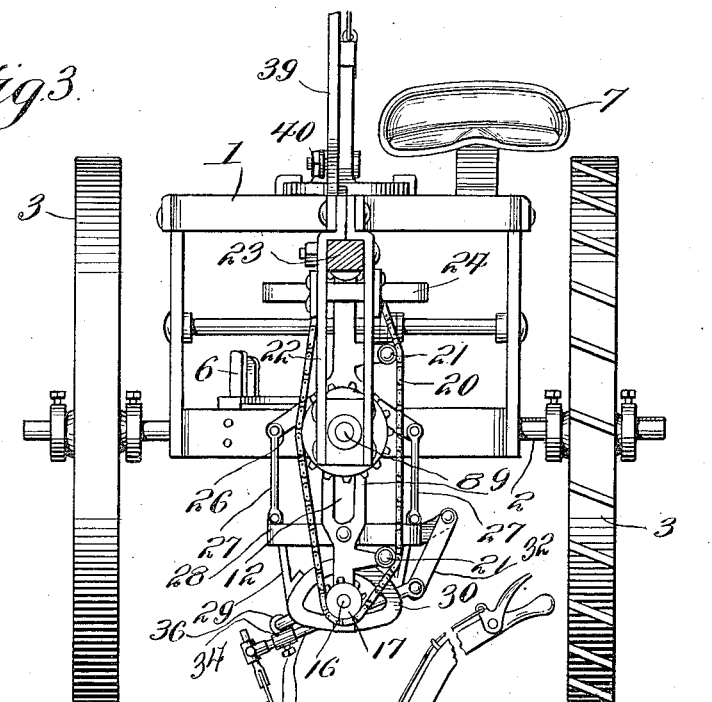
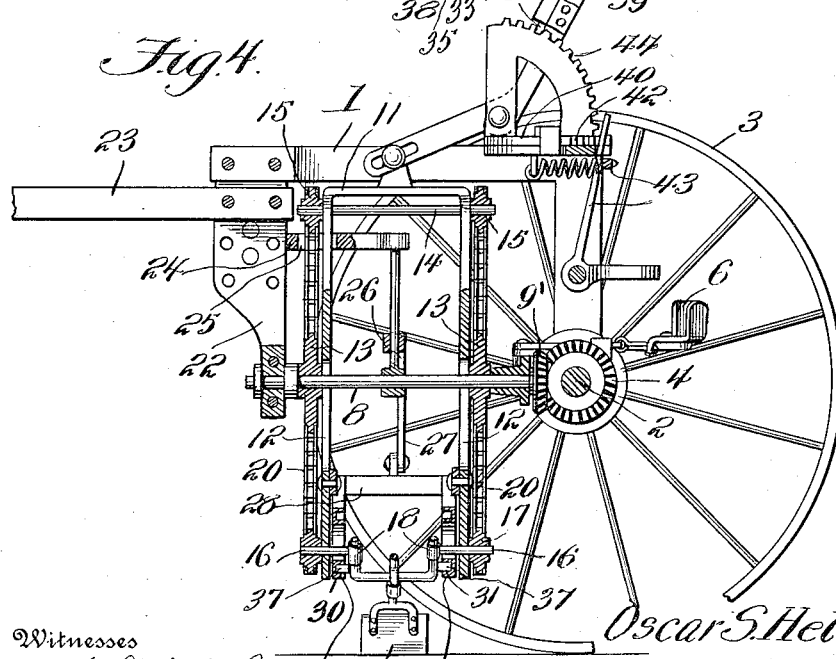

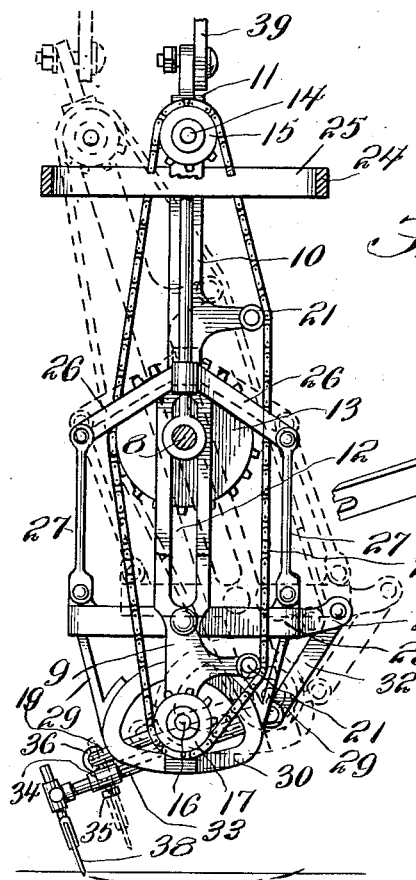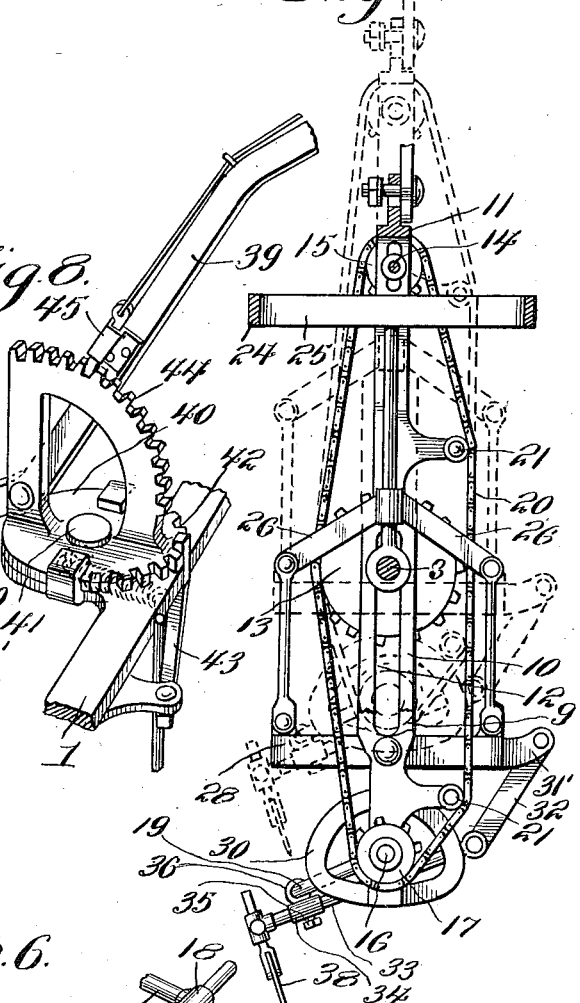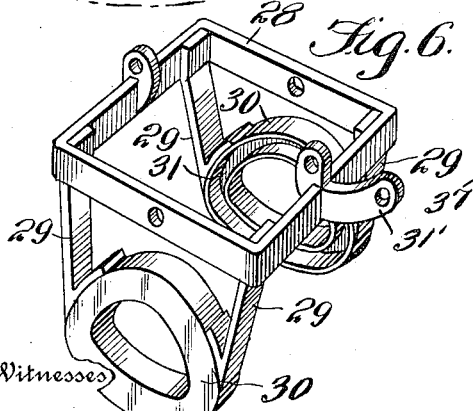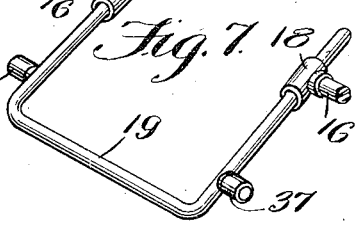

UNITED STATES PATENT OFFICE.

OSCAR S. HELLUMS, OF DAWSON, TEXAS.

COTTON-CHOPPER.

1,064,645.

Specification of Letters Patent.    Patented June 10, 1913.

Application filed August 1, 1912.   Serial No. 712,740.

*To all whom it may concern:*

Be it known that I, OSCAR S. HELLUMS, a citizen of the United States, residing at Dawson, in the county of Navarro and State of Texas, have invented new and useful Improvements in Cotton-Choppers, of which the following is a specification.

This invention relates to machines for thinning rows of growing plants and particularly to that class of machines which are generally known as cotton choppers.

One object of the present invention is to produce a machine of simple and improved construction which may be operated efficiently not only to thin the plants when the rows are straight and perfect, the land level and free from obstructions, the seeds evenly planted, and other conditions are favorable, but which may be effectively used on rough and hilly land and where the conditions are such as to 'require adjustment and adaptability of the machine to meet existing circumstances.

A further object of the invention is to produce a machine of the class described embodying a hoe and mechanism for actuating the same to cause it to make regular strokes across the row of plants, and embodying also a hoe carrying frame of simple and improved construction which may be conveniently adjusted to operate efficiently and satisfactorily under various circumstances.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a side elevation of a cotton chopper constructed in accordance with the invention. Fig. 2 is a top plan view of the same. Fig. 3 is a front elevation. Fig. 4 is a longitudinal sectional view taken on the line 4—4 in Fig. 2. Fig. 5 is a detail front view, enlarged, of the hoe carrying frame with dotted lines showing the frame tilted. Fig. 5ª is a front view, enlarged, of the hoe carrying frame with dotted lines showing the frame raised. Fig. 6 is a perspective detail view of the hoe guiding cam, together with the frame carrying the same and related parts. Fig. 7 is a perspective detail of the hoe actuating mechanism. Fig. 8 is a perspective detail view of the supporting means for the adjusting lever of the hoe carrying frame.

Corresponding parts in the several figures are denoted by like characters of reference.

The main frame 1 of the improved machine is supported on an axle 2 having supporting wheels 3, one of which is fixed on the axle to cause rotation of the latter in its bearings for the purpose of driving the moving parts of the machine, while the other wheel is preferably loose on the axle for convenience in turning. The axle carries intermediate the ends thereof a bevel gear 4 which is loose thereon but which may be operatively connected therewith by means of a clutch 5 of ordinary well known construction, said clutch being controlled by a lever 6 which is conveniently accessible to the driver or operator whose seat 7 is suitably supported on the frame.

The frame of the machine affords bearings for a longitudinal shaft 8 which is located at right angles to the axle from which it is driven by means of a bevel pinion 9′ meshing with the gear wheel 4, it being obvious that the motion of the shaft 8 may be interrupted at will by actuating the clutch 5. The shaft 8 serves to drive and actuate the chopping hoe which is mounted, arranged and operated as I shall now proceed to describe.

The hoe carrying frame is composed of front and rear members 9, 10 connected together at their upper ends by a bridge piece 11, and said front and rear members having vertical slots 12 straddling the shaft 8 with reference to which the hoe carrying frame may thus be vertically adjusted. The shaft 8 is provided adjacent to the front and rear members 9 and 10 of the hoe carrying frame with sprocket wheels 13, and the members 9, 10 are provided adjacent to their upper ends with bearings for a shaft 14 carrying sprockets 15. The members 9, 10 are provided adjacent to their lower ends with bearings for shafts 16 carrying sprockets 17, said shafts being also provided with sleeves 18 wherein the limbs or side members of a crank 19 are guided for radial movement with reference to the shafts 16. Chains or link belts 20 are guided adjacent to the members 9, 10 over the sprockets 13, 15 and 17, said chains being offset to one side of the sprocket wheels 13 by means of idlers 21 to permit vertical adjustment of the frame and at the same time to permit motion to be transmitted from the sprocket wheels 13 on the shaft 8 to the crank carrying shafts 16.

The forward end of the shaft 8 is supported in a bearing at the lower end of a post 22 which constitutes a part of the main frame structure and which may also serve as a means for the attachment of the tongue 23 which is preferably mounted in such a manner as to be vertically adjustable on the post 22, so as to enable it to be fitted to teams of various heights. The post 22 supports a bracket 24 having a slot 25 for the passage of the front member 9 of the frame and related parts, said bracket 24 terminating intermediate the front and rear members 9, 10, and said bracket being provided with terminal divergent arms 26 with which are connected the upper ends of links 27, the lower ends of which are pivotally connected with the side members of a horizontal frame 28, the front and rear members of which are mounted upon the members 9, 10. The front and rear members of the horizontal frame 28 are also provided with downwardly extending arms 29 supporting adjacent to each of the members 9, 10 a wheel or disk 30 having a cam groove 31 of suitable shape for a purpose to be presently set forth.

One of the side members of the frame 28 is provided midway between its ends with a lug 31' on which is pivoted the upper end of a link 32, the lower end of which is pivotally connected with one end of the hoe handle 33, which latter is provided with a sleeve 34, longitudinally adjustable thereon and capable of being secured at various adjustments by a set screw 35, said sleeve having a transverse cuff 36 constituting a bearing that engages the crank 19. The limbs of said crank which, as previously stated, are slidably mounted in the sleeves 18 of the shafts 16, are provided with wrist pins 37 that are guided in the cam grooves 31 of the disks 30. It will be readily seen that by the construction herein described, when the machine is in operation, the hoe handle will receive an orbital movement which is governed by the shape of the cam groove 31 and which is designed to cause the hoe blade 38 at the end of the handle to make a quick stroke across the row of plants that is being operated upon and to be subsequently raised to an inoperative position and be carried back across the row at a sufficient elevation to avoid injury to the tender plants that are to be thinned.

For the purpose of effecting the desired adjustment of the hoe carrying frame an operating lever 39 is provided, said lever being fulcrumed on a turn table 40 which is revolubly supported on the main frame structure by means of a pin 41, said turn table being preferably provided with a plurality of notches 42 any one of which may be engaged by a spring actuated latch member 43, whereby the turn table will be held securely at the desired adjustment. The latch member may be released from the notches of the turn table to permit adjustment of the latter about its axis, by means of a suitably arranged hook lever 43. The turn table supports a quadrant 44 which may be engaged by a stop member 45 carried by the lever 39 for the purpose of securing said lever at various adjustments. One arm of the lever 39 is pivotally connected with the bridge piece 11 of the hoe carrying frame, which latter may thus be manipulated.

It will be seen from the foregoing description that by swinging or partly rotating the turn table 40 about its axis, the lever may be utilized for the purpose of tilting the hoe carrying frame about the axis of the shaft 8, thereby enabling the hoe carrying frame to be adjusted to various deviations from a straight line of the row of plants that is to be operated upon. Should obstructions be encountered in the nature of rocks, stumps or the like, the hoe carrying frame may be quickly lifted by means of the lever 39 so as to pass such obstructions without injury.

It will be readily understood that many of the parts of this machine may be changed and modified from the precise form and construction which has been herein shown without materially changing or affecting the operation of the machine or the efficiency thereof. It will also be understood that the hoe blade, which is preferably detachably connected with the handle, may be made of such a nature as to operate efficiently on tender plants by a light scraping action or that a heavier blade of a temper enabling it to hold a cutting edge may be used when the plants have attained a stage of growth where a positive cutting action is needed to remove them. I desire it to be understood that any such needed changes as come within the scope of the appended claims may be made without departing from the spirit of the invention.

Having thus described the invention, what is claimed as new, is:—

1. In a cotton chopper, a driven shaft, fixed bearings for said shaft, a vertically adjustable frame having slots straddling the shaft, a hoe supported by the frame and deriving motion from the shaft, and means for vertically adjusting and for laterally tilting the frame.

2. In a cotton chopper, a driven shaft, a vertically adjustable frame having slots straddling the shaft, a hoe supported by the frame for orbital movement and deriving motion from the shaft, and means for vertically adjusting and for tilting the frame.

3. In a cotton chopper, a driven shaft, a vertically adjustable hoe carrying frame having slots straddling the shaft, a second shaft deriving motion from the driven shaft, a radially slidable crank carried by the second shaft, a cam guiding the radially slidable crank, and a hoe operatively connected with the crank.

4. In a cotton chopper, a driven shaft, a hoe carrying frame, a second shaft carried by the hoe carrying frame and deriving motion from the driven shaft, a radially slidable crank carried by the second shaft, a cam guiding the movement of the radially slidable crank, a hoe operatively connected with the crank, and means for effecting vertical adjustment and tilting adjustment of the hoe carrying frame.

5. In a cotton chopper, a driven shaft, a vertically and tiltably adjustable hoe carrying frame, a second shaft carried by said frame and deriving motion from the driven shaft, a radially slidable crank carried by the second shaft, a cam guiding the movement of the crank, a hoe operatively connected with the crank, and supporting means for the cam including a horizontal member mounted on the hoe carrying frame, a relatively stationary bracket, and links connecting said bracket with the horizontal member.

6. In a cotton chopper, a driven shaft, a vertically adjustable and tiltably supported hoe carrying frame, short shafts supported for rotation at the lower end of the hoe carrying frame and deriving motion from the driven shaft, said short shafts having sleeves, a crank radially slidable in said sleeves and having wrist pins, cams engaging the wrist pins to guide the movement of the crank, a hoe operatively connected with the crank, and means for supporting the cams whereby said cams may be maintained in substantially constant parallel relation to the ground at various adjustments of the hoe carrying frame.

7. In a cotton chopper, a driven shaft, a vertically and tiltably adjustable hoe carrying frame, a hoe carried by said frame and deriving motion from the driven shaft, a turn table, a lever supported on the turn table and connected with the hoe carrying frame for adjustment of the latter, and means for retaining the turn table and the adjusting lever at various adjustments.

In testimony whereof I affix my signature in presence of two witnesses.

OSCAR S. HELLUMS.

Witnesses:
C. O. WEAVER,
E. B. DAWSON.